Dec. 10, 1957 S. J. FORBES ET AL 2,815,688
BORING BAR

Filed June 28, 1954 2 Sheets-Sheet 1

INVENTORS
SAM J. FORBES AND
PAUL S. SCHMIDT
by George Knowles
their ATTORNEY.

Dec. 10, 1957   S. J. FORBES ET AL   2,815,688
BORING BAR
Filed June 28, 1954   2 Sheets-Sheet 2

INVENTORS
SAM J. FORBES AND
PAUL S. SCHMIDT
by George Knowles
their ATTORNEY

United States Patent Office 2,815,688
Patented Dec. 10, 1957

2,815,688

BORING BAR

Sam J. Forbes, Shaker Heights, Ohio, and Paul S. Schmidt, Huntington Woods, Mich., assignors, by direct and mesne assignments, to The P. O. McIntire Company, Euclid, Ohio, a corporation of Ohio Application June 28, 1954, Serial No. 439,598

19 Claims. (Cl. 77—58)

This invention relates to boring tools or bars of the type supporting a number of axially spaced cutters for heavy machining. By way of example, the invention is applicable to a boring bar for machining the noses of projectiles or shells at high speed.

One of the principal problems in high speed machining is that of proving sufficient rigidity to the boring bar so as to maintain the positions of the cutters and prevent binding in the work. In multiple cutter bars where several cutters operate simultaneously or in sequence and without withdrawal of the bar from the work to perform various operations such as roughing, finishing, chamfering, and facing, this problem is aggravated. Flexure of the bar will cause inaccuracy in the machining resulting in unsatisfactory work. Furthermore, if the bar should flex, the bored hole may work out of concentricity and that in turn may cause increased flexure and whipping of the bar to the point of breakage.

It might be thought that the solution to the problem would reside in making the bar substantially the same size as the hole to be bored out. However, that is not a solution because the lack of sufficient clearance between the bar and the work hinders the escape of chips which, as a result, foul up the cutters causing undue wear and overheating.

An object of the invention is to provide a new and improved boring bar construction of maximum strength and rigidity along with provision for effective chip clearance.

Another object of the invention is to provide a multiple cutter boring bar of maximum strength and rigidity along with provision for discharging the chips from one cutter without fouling an adjacent cutter.

A further object of the invention is to provide in a boring bar having a pair of axially spaced horizontal cutters each with diametrically opposed cutting edges, suitable means for clearing out chips without fouling the cutters while providing maximum strength and rigidity in the bar.

Yet a further object of the invention is to provide means for efficiently cooling and lubricating the work in a boring bar of the instant character.

In accordance with the invention, the boring bar is made to a size not quite equal to the size of the hole which it is intended to bore out. The cutter is mounted in a transverse slot in the bar; where there are two or more cutters, they are mounted in axially spaced slots along the bar at approximately the same circumferential position, that is, in approximately the same radial plane. In order to provide for chip clearance, a flute, that is, a region of reduced radius, is provided in the side of the bar, which flute extends rearwardly from the cutter. Where there are two or more cutters, the flute may extend longitudinally from the forward cutter to the rear of the rearward cutter sufficiently to allow the chips to flow out freely from the work. The flute may have a cross sectional outline generally like a half of a circular segment; it would result from removing the metal of the bar external to chords normal to the cutters in the region preceding the leading edges of the cutters. For convenience herein, the end of the bar which first enters the work is referred to as the front or forward end, and the end which is held in the tool holder of the machine is referred to as the rear end. Also the cutting side of a cutter is referred to as its leading edge and its opposite side as the trailing edge.

In a preferred embodiment of the invention, the boring bar is designed to be supported with the cutters horizontal and in diametrically opposed pairs for cutting simultaneously at diametrically opposite points within the work. It will be appreciated that, with such an arrangement, one cutter of a diametrically opposed pair will have its leading or cutting edge uppermost whereas the other cutter will have its corresponding edge lowermost. The horizontal disposition of the cutters has decided advantages over a vertical disposition from the point of view of lubrication, cooling, and chip clearance. Where the cutters are vertical, it is extremely difficult to prevent fouling of the lower cutters by chips from the upper cutters and it is usually difficult to obtain equal lubrication of all cutters. For these reasons, a boring bar with horizontal cutters is much to be preferred. Furthermore in such a bar the cutters may be clamped by means of screws which are accessible from above and this is a very desirable feature from the point of view of lightening the burden of the operator in setting up the machine.

In a boring bar using multiple pairs of horizontal cutters having diametrically opposed cutting edges, it has been found that the problem of chip clearance is aggravated in the case of the cutters having their leading edges uppermost. Of course in any multiple boring bar there is a tendency for the chips from one cutter to be carried towards the other and to foul it. In the case of cutters having their leading edges lowermost, the problem is not too serious since the chips tend to fall by gravity away from the first cutter. But in the case of cutters having their leading edges uppermost, the fouling is serious and may result in the need for unduly frequent regrinding of the cutters. In accordance with the invention this problem is resolved by providing along the side of the bar where the cutters have their leading edges uppermost, a flute having a cross sectional outline generally like a full segment of a circle and resulting from a chordal plane normal to the cutters. Thus in the preferred embodiment of the invention wherein the boring bar has two or more axially spaced pairs of horizontal cutters, each pair comprising one cutter having its leading edge uppermost and a companion cutter having its leading edge lowermost, the flutes are provided on each side of the bar. The flute for the cutters having their leading edges lowermost has a cross section of a half of a segment, whereas that for the cutters having their leading edges uppermost has a cross section of a full segment.

According to a further feature of the invention, the flute or portion of the periphery of the bar which is removed is not extended right up to each cutter but terminates short of the cutter so as to leave a projecting shoulder to back up the cutter on its trailing face and on its rear face. If desired, a projecting shoulder may also be left at the front face of the cutter but a shoulder at that face is of less advantage in taking up the stress to which the cutter is subjected. With such a structure, the cutters are adequately supported by the bar and the region of reduced radius at the trailing sides of the cutters having their leading edges uppermost provides a channel between the bar and the work into which the chips may escape without fouling the cutters.

According to a further feature of the invention, the flute may be extended along the side of the bar so as to provide a longitudinal groove between the bar and the work through which a jet of cutting oil or other fluid may be squirted to serve both as lubricant and coolant. Preferably, the coolant is squirted into the longitudinal space lying just to the leading side of the cutting edges of the cutters. The coolant may be supplied in various ways and conveniently the shank of the bar may have in it an axial feed channel for supplying the coolant to one or more orifices from which the jets are projected. A hollow bolt may be screw threaded into the rear end of the shank of the bar to secure the tool in a suitable socket or head-stock while the bore in the bolt allows the passage of coolant into the bar.

For further features and advantages of the invention, attention is now directed to the following description and accompanying drawings of a preferred embodiment representative of the best mode of practicing the invention. The features of the invention believed to be novel will be more particularly pointed out in the appended claims.

In the drawings, wherein like numerals in the several figures denote corresponding parts:

Figure 2:
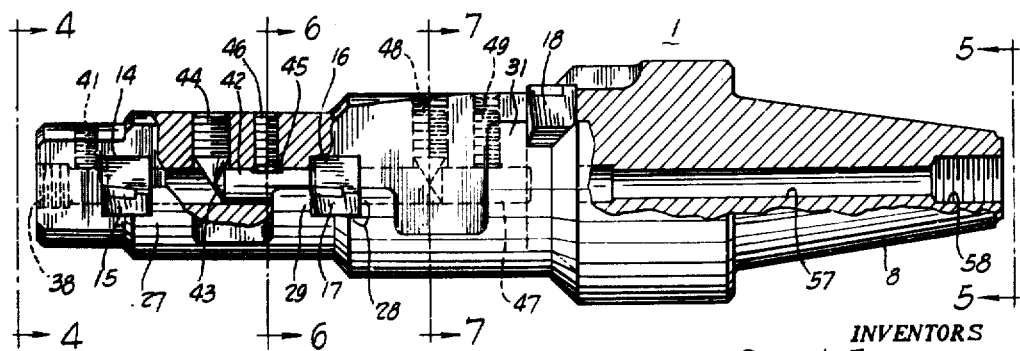
Fig. 2 is a front side elevation of the boring bar, also with the cutters in position, and with fragments broken away to show the internal arrangement of parts.
Figure 6:
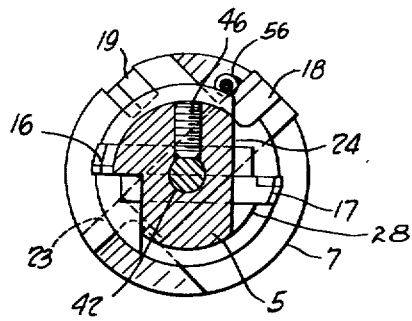
Figure 7:
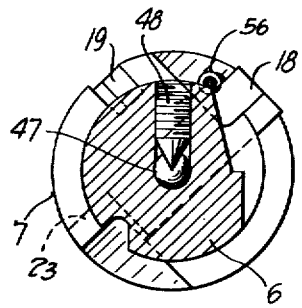

Figs. 6 and 7 are sectional views through the section lines 6—6 and 7—7 respectively in Fig. 2 and seen in the direction indicated by the arrows.

Figure 8:
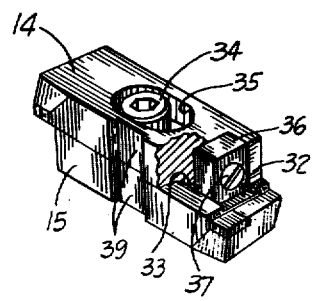

Fig. 8 is a pictorial view of a pair of adjustable cutters used with the bar, a fragment of the upper cutter being cut away for illustrative purposes.

Figure 3:
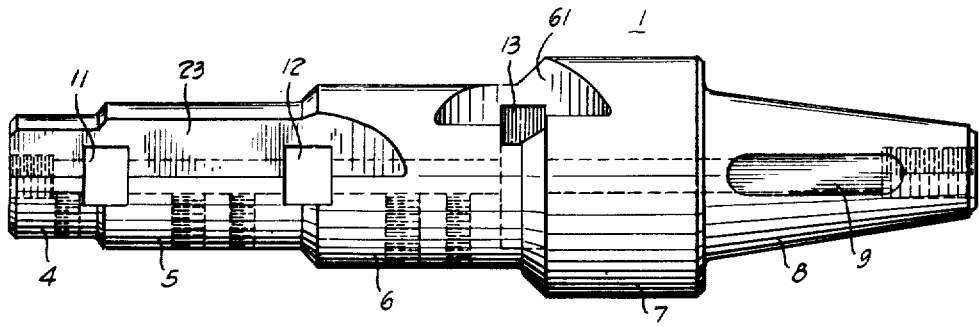
Fig. 3 is a view of the rear side of the boring bar with the cutters removed. It is the view seen upon revolving the boring bar of Fig. 1 90° to bring its rear side into the plane of the paper.
Figure 1:
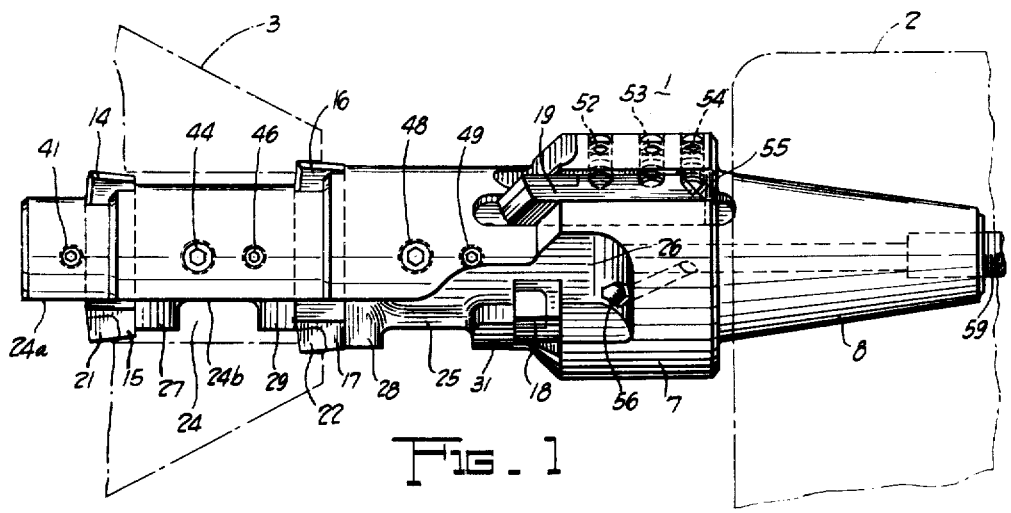
Fig. 1 is a plan view of a boring bar embodying the invention with the cutters mounted in position therein.

Referring to the drawings and more particularly to Fig. 1, there is shown a boring bar 1 operatively mounted in a tool holder 2 which may be the tailstock or a tool block on the sliding table of a boring machine. The tool holder 2, along with the nose of a projectile 3 being bored by the machine, are shown in phantom as these are not actually part of the invention. The bar is made of hardened tool steel and comprises a body portion including four stepped portions 4 to 7 of progressively increasing diameter and a tapered shank portion 8. The shank portion is provided in the usual fashion with a keyway 9 for locking the shank in the tool holder. At the junctures of the step portions, the bar is pierced transversely with rectangular holes 11, 12, and 13, best seen in Fig. 3. The holes or slots 11, 12 are in the same horizontal plane and the former accommodates the roughing cutters 14, 15 and the latter the finishing cutters 16, 17. The cutters 14, 15, 16, and 17 are preferably of conventional construction each having four surfaces which define a rectangular cross section. Slot 13 is placed at 45° relative to the plane of slots 11, 12 and accommodates a facing cutter 18. The portion of maximum diameter 7 is slotted longitudinally to accommodate a chamfering cutter 19. The cutters are tipped with tungsten carbide, the carbide being shown at 21 and 22 in the case of cutters 15, 17 wherein the leading edges are uppermost, as readily seen in Fig. 1.

Figure 4:
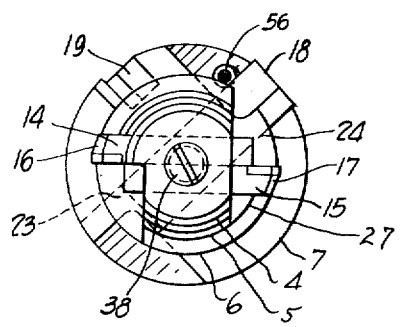
Figs. 4 and 5 are left and right end views respectively of the boring bar as seen in Fig. 2.
Figure 5:
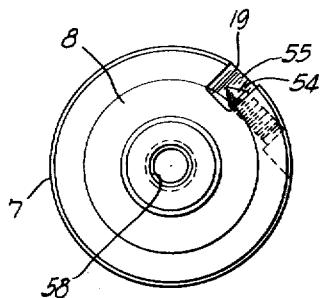

Cutters 14, 16 whereof the leading edges are lowermost, have those edges adjoining a flute 23 (best seen in Fig. 3) which extends longitudinally along the side of the bar from the forward end to a point rearward of the finishing cutters 16, 17. As is shown in Fig. 4, the flute 23 has a cross section substantially like a half of a circular segment, being produced by a chordal plane normal to the transverse axis of the cutters 14, 15 which plane is interrupted approximately on the horizontal center line of the cutters. Although in Fig. 3, flute 23 appears above the horizontal center line of the slots for cutters 14, 16, that is due to the mode of representation in the drawing whereby the boring bar has been rotated 180° with respect to the true front side elevation shown in Fig. 2. In the actual use of the bar, flute 23 is located below the transverse center line of the cutters and appears as shown in Fig. 4, namely it leads the cutter with respect to the work. The work, that is the projectile 3, revolves in a counter clockwise direction when looking at its end, that is, when looking from right to left with reference to Fig. 1. A flute having the above described configuration results in a minimum reduction of strength in the bar and is very effective in providing for the discharge of chips from the cutters 14 and 16 which cut with their lower surfaces.

Cutters 15 and 17 on the other hand, cut with their upper surfaces and with these the problem of chip clearance is more difficult. In order to prevent fouling of the cutters, a flute, which might also be termed a flat, is formed at 24 in the side of the boring bar. This flute extends from the region 24a at the front end of the bar to the region 24b to the rear of roughing cutter 16, and in the case of a bar accommodating only a single cutter, the flute could terminate there. However in the illustrated embodiment, the flute is extended into region 25 to the rear of finishing cutter 17 and from there is continued into a lateral well 26 which terminates about the middle of the maximum diameter portion 7 and accommodates facing cutter 18. Thus all of the cutters which have their leading faces uppermost, namely roughing cutter 15, finishing cutter 17, and facing cutter 18 are accommodated within the flat 24 or within its well-like extension 26 wherein the bar is of reduced radius.

To the rear of and also below the cutter 15, a projecting shoulder 27 provides support to the bar close to its cutting tip in order to absorb the stress induced in the cutter by the work turning against it. In the case of cutter 17, a shoulder portion is provided which surrounds the cutter except for its leading face; in other words, the shoulder portion is provided not only at 28 to the rear of and below the cutter but also at 29 to the front of the cutter. The shoulder portion at 29 is useful in supporting the cutter but is of less importance than the shoulder portion at 28. The facing cutter 18 is also provided with a reinforcing supporting shoulder at 31 along its forward face. It has been found that through the provision of a flute 24 wherein a lateral sector is removed from a side of the bar where the cutters have their leading edges uppermost, the chips from the first cutter can escape through the space of reduced radius between it and the next cutter. Thus the chips from the roughing cutter 15 escape without fouling itself or the finishing cutter 17 and this result is achieved with the least reduction in the cross section of the boring bar and accordingly with maximum strength in the boring bar.

The roughing cutters 14, 15 and the finishing cutters 16, 17 may each consist of a pair of opposed cutters mounted face to face as illustrated pictorially in Fig. 8. One cutter, namely 15 in the drawing is provided with a longitudinal groove 32 and the other cutter 16 is provided with a cooperating tongue 33 which slides longitudinally in the groove. A cap screw 34 extends through a longitudinal slot 35 in cutter 14 into a threaded hole in cutter 15 and serves to clamp the two cutters together. In addition, an upstanding block 36 fastened into the groove 32 on cutter 15 fits into a recess in the end of cutter 14 and has extending through it an adjusting screw 37 which engages the transverse face of the recess so as to permit a micrometer adjustment of one cutter relative to the other.

The front cutters 14, 15 for the roughing cut are secured in position by an axial clamping screw 38 (Fig. 2) threaded in the front portion of the bar. This screw has a chamfered nose which engages the groove 39 (Fig. 8) formed partly in the one cutter and partly in the other. The transverse groove 39 has slopping sides and the frusto-conical end of the clamping screw 38 is accurately ground so as to effect accurate centering of the cutters in the bar. The clamping screw is locked in position by a set screw 41 which engages a non-threaded portion of the clamping screw 38.

The finishing cutters 16, 17 which are constructed as an adjustable pair similar to the roughing cutters, and also the facing cutter 18 are secured in their slots through a somewhat similar arrangement. Thus in the case of cutters 16, 17 there is provided a clamping pin 42 which is received in a bore formed axially in the body of the bar. The clamping pin has a frusto-conical end which engages in the groove 39 (Fig. 8) formed in the side of the cutters. The forward end 43 of the clamping pin 42 is tapered or conical and is engaged by the tapered lower end of a clamping screw 44 received in a vertical threaded hole in the body of the bar. As the clamping screw is screwed down, it forces the clamping pin 42 rearwardly, that is to the right as shown in Fig. 2, and locks the finishing cutter in position. The clamping pin has a flat 45 formed on its upper face which is engaged by a set screw 46 also received in a vertical threaded hole in the body of the bar. After the clamping screw has been tightened, the set screw is screwed down to lock the clamping pin in position. The facing cutter 18 is secured in similar fashion by the clamping pin 47, clamping screw 48, and set screw 49. It will be observed that the clamping screws and set screws are accessible from above, which feature is a decided advantage in reducing set-up time for the machine.

The chamfering cutter 19 which is received in a longitudinal groove in maximum diameter portion 7, is held in position by means of a pair of set screws 52, 53 threaded through holes extending along chords of the bar and opening through the face of the groove in which the cutter rests. In addition a third screw 54 similarly placed serves as an adjusting screw and has a conical end engaging an inclined face 55 at the rear end of the chamfering cutter 19. By screwing screw 54 in, a micrometer adjustment of the chamfering cutter can be made prior to clamping it. This screw also serves to back up the cutter and assist the friction of the set screws in preventing it from being thrust rearwardly.

The recess 26 which is an extension of the sector-like flute 24, is provided on its rear wall with a jet nozzle 56. This nozzle communicates with a central axial bore 57 in the shank of the bar which bore is threaded at 58 to receive a hollow bolt 59 for retaining the tool in its tapered socket in the head-stock of the machine. The rear end of this bolt is connected to a pipe (not shown in the drawings) through which a coolant such as a high temperature cutting oil, is supplied to the jet nozzle. The nozzle is adjusted to squirt the coolant into the longitudinal space across the leading faces of the roughing and finishing cutters. Thus the sector-like flute 24 provides a very convenient channel for supplying cooling and lubricating fluid to the faces of the cutters. In the illustrated embodiment, only the flute 24 has been provided with a cooling jet nozzle; however, if desired, the flute 23 may also be similarly provided by extending it, in similar fashion to flute 24, into the well region 61 which accommodates the rear of the facing cutter 18 and by locating a nozzle in that well suitably oriented to direct its stream across the faces of the roughing and finishing cutters 14 and 16.

The roughing and finishing cutters are constructed so that they may readily be adjusted to compensate for wear. It will be appreciated that these cutters should take equal cuts so as to avoid any tendency to bend the boring bar and cause it to bind in the work. After the cutters have become dulled, the cutting edges are reground and the cutters may then be accurately adjusted and centered in the boring bar in the following manner. The cutters of a pair removed from a bar are adjusted to the desired internal diameter by means of adjusting screw 37 (Fig. 8) and then clamped together by clamping bolt 34. The grooves 39 in each cutter will then no longer be in registry and in each case the rear face of the groove of one cutter will overlap the front face of the groove of the other cutter. To correct this condition, the two cutters are mounted in a jig and the cutting tip of one is brought up against a stop after which a jig grinder is run against the rear face of its groove, to restore the original spacing thereof from the cutter tip. Without removing the cutters from the jig, they are turned about and the cutting tip of the other cutter brought against the stop after which the jig grinder is again passed against the groove so as to grind in similar fashion the rear face of the groove of the second cutter. In this way the rear faces of the grooves are restored to their original spacing apart so that the clamping pin can engage them in its original position, the cutters being located by the diagonal engagement of the pin in the rear faces of the grooves of each cutter. At the same time, the distance between each cutting tip and the rear face of its groove being precisely the same, the cutting edges will be exactly relocated upon reassembly of the cutters in the bar.

It has been found, in actual use, that a boring bar made in accordance with the invention provides a decided reduction in the difficulties encountered in high speed heavy machining. The features providing for chip clearance and cooling jets make for more effective use of the cutters. By way of example, in one specific embodiment, the diameter of the front portion 4 of the bar was 1¼", the next portion 5 was 1½", and the next portion 6 was 1¾", the flat flute 24 being in a vertical plane at a distance of 7⁄16" from the axis of the bar. Such a boring bar provided with chip relief flutes as described herein and illustrated in the drawings, achieves a several fold increase in the amount of machining which can be done between regrindings of the cutters. Furthermore, the wear as between cutters having their leading edges uppermost and cutters having their leading edges lowermost is substantially equalized, thereby further contributing to the life of the cutters.

While a certain specific embodiment of the invention has been shown and described, the same is to be taken as illustrative and not as limitative of the invention. The proportion and size of the boring bar along with the specific features of the cutters supported in it, and also the mode of support of the cutters may be varied widely without departing from the invention. Also it will be appreciated that whereas a rather simple boring bar comprising only one pair of roughing cutters and one pair of finishing cutters has been described, the principles underlying the invention are equally applicable to smaller bars carrying only one cutter and to larger sizes of boring bars carrying a multiplicity of cutters for performing a variety of operations in a single pass of the work. The appended claims are therefore intended to cover any such modifications coming within the true spirit and scope of the invention.

What we claim and desire to secure by Letters Patent of the United States is:

1. A boring bar comprising a body having first and second coaxial portions having cylindrically curved surfaces of different diameters, the coaxial portions being in end to end relation, said bar having a pair of flute reliefs extending longitudinally through said coaxial portions, and a pair of cutters disposed at the junction of said first and second coaxial portions having two diametrically opposite cutting edges projecting oppositely and laterally from said bar through the flute reliefs, one flute relief having a substantially flat surface in a plane chordal to the circumferences of said bar portions and parallel to the axis of said bar and the other flute relief having a surface defined by a plane chordal to the circumferences of the bar portions and substantially parallel to the axis of the bar and to the one flute relief, the other flute relief being further defined by a surface lying in a plane substantially normal to the chordal plane and parallel to the adjustment axis of the projecting cutters, the cutting edges being located in said normal plane.

2. A boring bar comprising a body having three steps, the steps having cylindrically shaped surfaces of different diameters, the steps being coaxial portions in end to end relation, said bar having a flute relief defined by angularly disposed intersecting surfaces extending longitudinally through said steps, a first cutter disposed at the junction of said first and second steps, and a second cutter disposed at the junction of the second and the third steps, said first and second cutters projecting laterally from the bar into the flute relief, having cutting edges in a common axial plane and being rough and finish cutters respectively, one of the intersecting surfaces of the flute relief being a substantially flat surface defined by a plane chordal to the circumferences of said steps and another of the intersecting relief surfaces generating another plane parallel to the axis of said bar and containing the cutting edges of the cutter.

3. A boring bar having an end arranged to be supported by a tool holder, said bar comprising a body having first and second steps, the steps being coaxial portions having cylindrically shaped surfaces of different diameters in end to end relation, and a cutter disposed at the junction of said first and second steps and projecting laterally from the bar, said bar having a flute relief extending longitudinally through said steps, the flute relief being defined by angularly disposed intersecting surfaces one of which includes a flat portion that generates a plane containing substantially the longitudinal axis of the bar and also the working edge of the cutter and another of which includes a flat portion that generates a plane chordal to the circumferences of the steps and parallel to the axis of the bar, said bar having a lateral well adjoining and continuous with said flute relief between the cutter and the tool support end, said bar being formed with a fluid passage having an opening into the well for ejection of liquid coolant in a trajectory substantially parallel to the axis of the body, whereby liquid coolant under pressure may be supplied to flood the flute relief and the cutter.

4. A boring bar comprising a body having a generally cylindrical surface of a diameter slightly less than the hole to be bored, the bar having front and rear ends, the front end being insertable in relative movement into a work piece to be bored, the rear end being supportable by a tool holder, and a pair of cutters removably supported by the bar in transverse relation for endwise adjusting movement and projecting oppositely and laterally from said body portion, said bar having a first flute relief extending longitudinally along the surface of the body portion in both directions from one of said cutters, the first flute relief being defined by a plane chordal to the surface of the body and parallel to the axis of the body and a flute rear end surface connecting the chordal plane surface to the cylindrically curved body surface at a point of the latter located between the one cutter and the rear end of the bar, said bar having a second flute relief extending longitudinally along the surface of the body portion in both directions from the other of said cutters, the second flute relief being substantially diametrically opposite the first flute relief and defined by a plane chordal to the surface of the body and parallel to the axis of the body and a flute rear end surface connecting the chordal plane surface to the cylindrically curved body surface at a point of the latter located between the other of said cutters and the rear end of the bar, and the second flute relief being further defined by a surface lying in a plane substantially normal to the chordal planes, containing the longitudinal axis of the bar and the working edge of said other of the cutters and substantially parallel to the adjustment axis of the laterally projecting cutters.

5. A boring bar comprising a body having three steps having cylindrically shaped surfaces of different diameters, the steps being coaxial portions in end to end relation, a first pair of cutters disposed at the junction of said first and second steps, and a second pair of cutters disposed at the junction of said second and third steps, said first and second pairs of cutters each having two diametrically located cutting edges projecting oppositely and laterally from said bar, said first and second pairs of cutters having their cutting edges in a common plane and being rough and finish cutters respectively, said bar having a pair of flute reliefs extending longitudinally through said cylindrical steps, one flute relief substantially surrounding one of the cutters of each pair of cutters and having a substantially flat surface defined by a plane chordal to the circumference of said bar and parallel to the axis of said bar, said bar having a pair of re-enforcing shoulders, the shoulders interrupting and defining both the axial and circumferential extent of a portion of the surface of the one flute relief, one of said shoulders having an outer surface defined by the contour generated by surface of the second step and abutting one cutter of the first pair of cutters in supportable relationship, the other of said shoulders having an outer surface defined by the contour generated by the surface of the third step and abutting one cutter of the second pair of cutters in supportable relationship, and the other flute relief having a surface defined by a plane chordal to the circumferences of the steps and substantially parallel to the axis of the bar and a plane substantially normal to the chordal plane and substantially parallel to the plane of the cutting edges of the laterally projecting cutters.

6. A boring bar comprising a body having a generally cylindrical surface of a diameter slightly less than the hole to be bored, the bar having front and rear ends, the front end being insertable in relative movement into a work piece to be bored, the rear end being supportable by a tool holder, a cutter removably supported by the bar for endwise adjusting movement and projecting laterally from the body, said bar having a flute relief extending longitudinally along the surface of the body in both directions from the cutter, the flute relief having a longitudinally extending main surface defined by a plane chordal to the surface of the body and parallel to the axis of the body, by a plane normal to said chordal plane and a flute rear end concave curved surface connecting the chordal plane surface to the cylindrically curved body surface at a point of the latter located between the cutter and the rear end of the bar, said bar having a chip escape relief adjoining the flute relief between the cutter and the rear end of the bar, and the chip escape relief being of greater extent circumferentially of the bar than the flute relief and being defined by a plane chordal to the surface of the body portion and being continuous with the flute relief to provide a circumferential passage for work cuttings.

7. A boring bar comprising a body having a generally cylindrical surface of a diameter slightly less than the hole to be bored, the bar having front and rear ends, the front end being insertable in relative movement into a work piece to be bored, the rear end being supportable by a tool holder, a cutter removably supported by the bar for endwise adjusting movement and projecting laterally from the body, said bar having a flute relief extending longitudinally along the surface of the body in both directions from the cutter, the flute relief having a longitudinally extending main substantially flat surface lying in a plane chordal to the circumference of the body portion and parallel to the axis of the body portion, said bar having a shoulder projecting radially from the chordal surface of the flute relief and disposed in supporting relation to the cutter, the shoulder having an outer surface defined by the contour generated by the cylindrical surface of the body, and the projecting shoulder being intermediate and longitudinally spaced from the ends of the chordal surafce of the flute relief.

8. A boring bar comprising a body having a generally cylindrical surface of a diameter slightly less than the hole to be bored, the bar having front and rear ends, the front end being insertable in relative movement into a work piece to be bored, the rear end being supportable by a tool holder, two longitudinally spaced cutters removably supported by the bar in transverse relation for endwise adjusting movement and projecting laterally from the body portion, said bar having a flute relief extending longitudinally along the body portion continuous between the longitudinally spaced cutters and continuous in both longitudinal directions from the cutters, the flute relief being defined by a planar surface in a plane chordal to the surface of the body and parallel to the axis of the body and by a flute rear end surface connecting the chordal plane surface of the cylindrically curved body surface at a point of the latter located between the cutters and the rear end of the bar, said bar having a first chip escape relief adjoining the flute relief at a point between the cutters and a second chip escape relief adjoining the flute relief at a point between the rear end of the bar and the cutters, and the chip escape reliefs each having a surface defined by a plane chordal to the surface of the body portion and being continuous with and of greater circumferential extent than the flute relief to provide passages for work cuttings.

9. A boring bar comprising a body having a generally cylindrical surface of a diameter slightly less than the hole to be bored, the bar having front and rear ends, the front end being insertable in relative movement into a work piece to be bored, the rear end being supportable by a tool holder, and first and second axially spaced pairs of cutters removably supported by the bar for endwise adjusting movement and projecting oppositely and laterally from the surface of the body portion, the first pair of cutters being between the second pair of cutters and the front end of the bar, the second pair of cutters being between the first pair of cutters and the rear end of the bar, said bar having a first flute relief, extending longitudinally along the surface of the body portion in both directions from and between one of the cutters of each of said pairs of cutters, the first flute relief being defined by a plane chordal to the surface of the body and parallel to the axis of the body and a flute rear end surface connecting the chordal plane surface to the cylindrically curved body surface at a point of the latter located between the one cutter of the second pair of cutters and the rear end of the bar, said bar having a second flute relief extending longitudinally along the surface of the body portion in both directions from and between the other cutter in each of said pairs of cutters, the second flute relief being defined by a plane chordal to the surface of the body and parallel to the axis of the body and a flute rear end surface connecting the chordal plane surface to the cylindrically curved body surface at a point of the latter located between the other cutter of the second pair of cutters and the rear end of the bar, the second flute relief being further defined by a surface lying in a plane substantially normal to the chordal planes and containing the adjustment axes of the laterally projecting cutters.

10. A boring bar comprising a body having a generally cylindrical surface of a diameter slightly less than the hole to be bored, the bar having front and rear ends, the front end being insertable in relative movement into a work piece to be bored, the rear end being supportable by a tool holder, and at least two longitudinally spaced cutters removably supported by the bar for endwise adjusting movement along axes transverse to the bar and in a common axial plane and projecting laterally from the body portion, said bar having a flute relief extending longitudinally along the body portion between the longitudinally spaced cutters and in both longitudinal directions from the cutters, the flute relief being defined by a plane chordal to the surface of the body and parallel to the axis of the body and a flute rear end surface connecting the chordal plane surface to the cylindrically curved body surface at a point of the latter located between the cutters and the reare end of the bar, said bar having a first shoulder projecting radially from the chordal surface of the flute relief and disposed in supporting relation to the cutter, the first shoulder having an outer surface defined by the contour generated by the cylindrical surface of the body, the projecting first shoulder being intermediate and longitudinally spaced from the ends of the chordal surface of the flute relief and said bar having a second shoulder projecting radially from the chordal surface of the flute relief and disposed in supporting relation to the other of the cutters, the second shoulder being intermediate and longitudinally spaced from the ends of the flute and extending longitudinally in both directions from the other cutter, the second shoulder having an outer surface defined by the contour generated by the cylindrical surface of the body, whereby each of the cutters is supported by a shoulder to resist forces generated against the cutters during a cutting operation.

11. A boring bar comprising a body having a generally cylindrical surface of a diameter slightly less than the hole to be bored, the bar having front and rear ends, the front end being insertable in relative movement into a work piece to be bored, the rear end being supportable by a tool holder, and first and second axially spaced pairs of cutters removably supported by the bar for endwise adjusting movement along axes transverse to the bar and in a common axial plane and projecting oppositely and laterally from the surface of the body portion, the first pair of cutters being between the second pair of cutters and the front end of the bar, the second pair of cutters being between the first pair of cutters and the rear end of the bar, said bar having a first flute relief, extending longitudinally along the surface of the body portion in both directions from and between one of the cutters of each of said pairs of cutters, the first flute relief being defined by a plane chordal to the surface of the body and parallel to the axis of the body and a flute rear end surface connecting the chordal plane surface to the cylindrically curved body surface at a point of the latter located between the one cutter of the second pair of cutters and the rear end of the bar, said bar having a second flute relief extending longitudinally along the surface of the body portion in both directions from and between the other cutter in each of said pairs of cutters, the second flute relief being defined by a plane chordal to the surface of the body and parallel to the axis of the body and a flute rear end surface connecting the chordal plane surface to the cylindrically curved body surface at a point of the latter located between the other cutter of the second pair of cutters and the rear end of the bar, the second flute relief being further defined by a surface lying in a plane substantially normal to the chordal planes and substantially parallel to the adjustment axis of the laterally projecting cutters, said bar having a first shoulder projecting radially from the chordal surface of the first flute relief and disposed in supporting relation to the one cutter of said first pair of cutters, the first shoulder being intermediate and longitudinally spaced from the front end of the bar and the second pair of cutters, said bar having a second shoulder projecting radially from the chordal surface of the first flute relief and disposed in supporting relation to the one cutter of the second pair of cutters, the shoulder being intermediate and longitudinally spaced from the rear end of the bar and the first pair of cutters, and the second shoulder extending longitudinally in both directions from the second pair of cutters, said bar having a lateral well adjoining and continuous with said first flute relief and located between the rear end of the bar and the cutters, the bar being formed with a fluid passage having an opening into the well for ejection of liquid coolant in a trajectory substantially parallel to the axis of the bar, whereby liquid coolant under pressure may be supplied to said opening to flood the first flute relief and the one cutter of each of said pairs of cutters.

12. A boring bar comprising a body having a generally cylindrical surface of a diameter slightly less than the hole to be bored, the bar having front and rear ends, the front end being insertable in relative movement into a work piece to be bored, the rear end being supportable by a tool holder, and a cutter removably supported by the bar for endwise adjusting movement and projecting laterally from the body, said bar having a flute relief extending longitudinally along the surface of the body in both directions from the cutter, the flute relief having a surface defined by a plane chordal to the surface of the body and parallel to the axis of the body and a flute rear end surface connecting the chordal plane surface to the cylindrically curved body surface at a point of the latter located between the cutter and the rear end of the bar, said bar having a chip escape relief adjoining the flute relief between the cutter and the rear end of the bar, the chip escape relief being of greater extent circumferentially of the bar than the flute and having a surface defined by a plane chordal to the surface of the bar which coincides with the chordal plane surface of the flute relief and the chip escape relief being continuous with the flute relief to provide a passage for work cuttings.

13. A boring bar comprising a body having a generally cylindrical surface of a diameter slightly less than the hole to be bored, the bar having front and rear ends, the front end being insertable in relative movement into a work piece to be bored, the rear end being supportable by a tool holder, and at least two longitudinally spaced cutters removably supported by the bar for endwise adjusting movement and projecting laterally from the body portion, said bar having a flute relief extending longitudinally along the body portion between the longitudinally spaced cutters and in both longitudinal directions from the cutters, the flute relief being defined by a plane chordal to the surface of the body and parallel to the axis of the body and a flute rear end surface connecting the chordal plane surface to the cylindrically curved body surface at a point of the latter located between the cutters and the rear end of the bar, said bar having a first chip escape relief adjoining the flute relief at a point between the cutters and a second chip escape relief adjoining the flute relief at a point between the rear end of the bar and the cutters, the chip escape reliefs each being of greater extent circumferentially of the bar than the flute and having a surface defined by a plane chordal to the surface of the bar which coincides with the chordal plane surface of the flute relief, the chip escape relief being continuous with the flute relief to provide a passage for work cuttings.

14. A boring bar comprising a body having a generally cylindrical surface of a diameter slightly less than the hole to be bored, the bar having front and rear ends, the front end being insertable in relative movement into a work piece to be bored, the rear end being supportable by a tool holder, two longitudinally spaced cutters removably supported by the bar in transverse relation thereto for endwise adjusting movement and projecting laterally from the body portion, said bar having a flute relief extending longitudinally along the body portion continuous between the longitudinally spaced cutters and continuous in both longitudinal directions from the cutters, the flute relief being defined by intersecting planar surfaces including a surface in a plane chordal to the surface of the body and parallel to the axis of the body and by a flute rear end concave curved surface connecting the chordal plane surface to the cylindrically curved body surface at a point of the latter located between the cutters and the rear end of the bar, and the other planar surface of the flute relief lying in a plane substantially normal to the chordal plane and containing the adjustment axes of the laterally projecting cutters.

15. A boring bar comprising a body having a generally cylindrical surface of a diameter slightly less than the hole to be bored, the bar having front and rear ends, the front end being insertable in relative movement into a work piece to be bored, the rear end being supportable by a tool holder, and a pair of cutters removably supported by the bar in transverse relation for endwise adjusting movement and projecting oppositely and laterally from said body portion, said bar having a first flute relief extending longitudinally along the surface of the body portion in both directions from one of said cutters, the first flute relief being defined by a plane chordal to the surface of the body and parallel to the axis of the body and a flute rear end surface connecting the chordal plane surface to the cylindrically curved body surface at a point of the latter located between the one cutter and the rear end of the bar, said bar having a second flute relief extending longitudinally along the surface of the body portion in both directions from the other of said cutters, the second flute relief being substantially diametrically opposite the first flute relief and defined by a plane chordal to the surface of the body and parallel to the axis of the body and a flute rear end surface connecting the chordal plane surface to the cylindrically curved body surface at a point of the latter located between the other of said cutters and the rear end of the bar, the second flute relief being further defined by a surface lying in a plane substantially normal to the chordal planes, containing the longitudinal axis of the bar and the working edge of said other of the cutters and substantially parallel to the adjustment axis of the laterally projecting cutters, said bar having a fluid opening, the fluid opening being located between the pair of cutters and the rear end of the bar and opening directly into one of the flute reliefs through the rear end surface of the latter, the fluid opening being arranged to direct liquid coolant into one of the said flute reliefs along a trajectory substantially parallel to the axis of the bar to flood the flute reliefs and the cutters, and said bar having a fluid passage communicating with said fluid opening whereby liquid coolant under pressure may be supplied to the fluid opening.

16. A boring bar comprising an elongated body having a generally cylindrical surface and front and rear ends, the front end being insertable in relative movement into a work piece to be bored, the rear end being adapted to be received and supported by a tool holder, a cutter mounted transversely on the bar for facile removal and replacement and for endwise adjusting movement transversely to the bar, said cutter projecting laterally from the body, said bar having a flute relief in the form of a longitudinally extending recess defined by two surfaces which intersect one another and which are continuous to and intersect the cylindrical surface of the bar, said relief recess extending toward both the front and rear ends of the bar from the cutter, one of the intersecting surfaces of the relief recess being in the form of a longitudinally extending main surface portion defined by a plane chordal to the surface of the body and parallel to the axis of the body and a rear end concave curved surface portion connecting the chordal plane surface to the cylindrically curved body surface at a point of the latter located between the cutter and the rear end of the bar, and the flute relief recess having its other intersecting surface in the form of a surface portion lying in a plane substantially normal to the chordal plane main surface portion and substantially parallel to the adjustment axis of the cutter.

17. A boring bar comprising an elongated body having a generally cylindrical surface and front and rear ends, the front end being insertable in relative movement into a work piece to be bored, the rear end being adapted to be received and supported by a tool holder, a cutter mounted transversely on the bar for facile removal and replacement and for endwise adjusting movement transversely to the bar, said cutter projecting laterally from the body, said bar having a flute relief in the form of a longitudinally extending recess defined by two surfaces which intersect one another and which are continuous to and intersect the cylindrical surface of the bar, said relief recess extending toward both the front and rear ends of the bar from the cutter, one of the intersecting surfaces of the relief recess being in the form of a longitudinally extending main surface portion defined by a plane chordal to the surface of the body and parallel to the axis of the body and a rear end concave curved surface portion connecting the chordal plane surface to the cylindrically curved body surface at a point of the latter located between the cutter and the rear end of the bar, the bar being formed with an internal fluid passage opening through said rear end concave curved surface portion directly into one end of the relief recess, and the fluid passage and opening being arranged to project liquid coolant supplied thereto into the relief recess along a trajectory substantially paralleling the longitudinal axis of the bar whereby to flood the relief recess and the cutter.

18. A boring bar comprising a body having first and second portions formed with cylindrically curved surfaces of different diameters, said portions being disposed in end to end coaxial relation, said bar being formed with a flute relief recess extending longitudinally of the coaxial portions and across the junction therebetween, a transverse recess in the bar at the junction, a cutter adjustably mounted in the transverse recess and projecting laterally from the bar through the longitudinally extending flute relief, the flute relief extending axially of the bar in both directions from the cutter and being defined by intersecting surfaces, one of said intersecting surfaces having a portion generating a plane chordal to the circumferences of the cylindrical bar portions and substantially parallel to the axis of the bar, another of said intersecting surfaces having a portion generating a plane disposed substantially normal to the chordal plane and substantially parallel to the adjustment axis of the cutter, and one of said intersecting surfaces including a concave curved portion tangent to its planar portion and extending to and intersecting the cylindrical surface of one of the body portions.

19. A stepped boring bar comprising a body having first, second and third cylindrically shaped portions of different diameters arranged axially in end to end relation, a first cutter disposed at the junction of the first and second portions, a second cutter disposed at the junction of the second and third portions, said first and second cutters projecting laterally from the bar and being rough and finish cutters, respectively, the first cutter being adaped to bore a cylindrical hole having a radius less than the radius of the third portion of the body but only slightly greater than the radius of the second cylindrical portion of the body, said second cutter being adapted to bore a cylindrical hole having a radius only slightly greater than the radius of the third cylindrical portion of the body, a flute relief recess formed in the body and extending longitudinally and continuously through all three of the cylindrically shaped body portions and across the junctions between the second body portion and the first and third body portions, said relief recess being defined by a planar chordal surface pierced by the cutters, and said flute relief having a concave curved surface located in the third body portion and intersecting the cylindrical surface of the latter, and the flute relief being defined by surface portions of the body disposed in a plane normal to the chordal plane surface and containing the cutting edges of the cutters.

References Cited in the file of this patent

UNITED STATES PATENTS

| 302,831 | Faught | July 29, 1884 |
| 1,002,457 | Rowe | Sept. 5, 1911 |
| 1,078,611 | Davis | Nov. 18, 1913 |
| 1,341,565 | Krepps | May 25, 1920 |
| 1,668,351 | Black | May 1, 1928 |
| 2,204,860 | Johnson | June 18, 1940 |

UNITED STATES PATENT OFFICE

CERTIFICATE OF CORRECTION

Patent No. 2,815,688            December 10, 1957

Sam J. Forbes et al.

It is hereby certified that error appears in the printed specification of the above numbered patent requiring correction and that the said Letters Patent should read as corrected below.

Column 1, line 21, for "proving" read -- providing --; column 5, line 3, for "slopping" read -- sloping --; column 10, line 10, for "reare" read -- rear --; column 12, line 41, after "the" strike out "said"; same line, after "into" insert -- said --; column 14, line 15, for "adaped" read -- adapted --.

Signed and sealed this 16th day of September 1958.

(SEAL)
Attest:

KARL H. AXLINE

Attesting Officer

ROBERT C. WATSON
Commissioner of Patents